Sept. 29, 1942. H. P. PHILLIPS 2,297,113
PISTON RING
Filed June 10, 1940
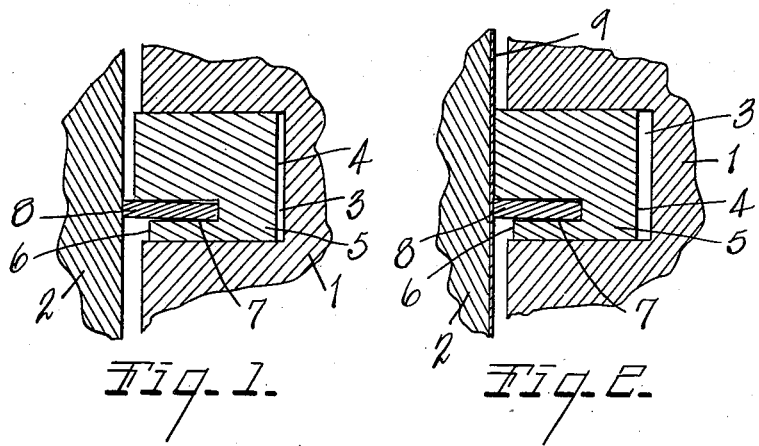
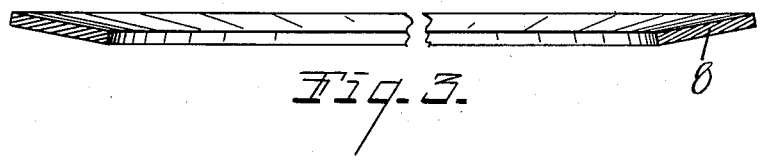
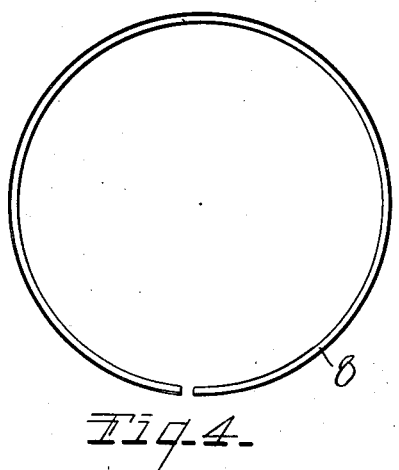
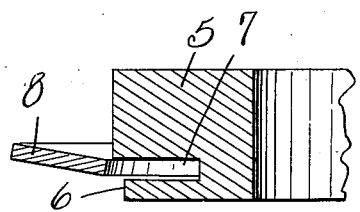
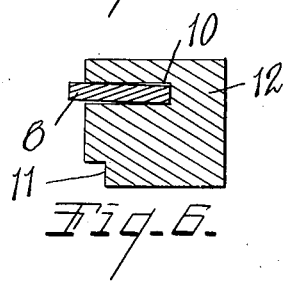
INVENTOR.
HAROLD P. PHILLIPS
BY Earl + Chappell
ATTORNEYS Patented Sept. 29, 1942

2,297,113

UNITED STATES PATENT OFFICE 2,297,113

PISTON RING

Harold P. Phillips, Hastings, Mich., assignor to Hastings Manufacturing Company, Hastings, Mich., a corporation of Michigan Application June 10, 1940, Serial No. 339,642

5 Claims. (Cl. 309—44)

This invention relates to improvements in piston rings.

The main objects of this invention are:

First, to provide a piston ring or piston ring assembly which is effective to apply a film of soft lubricating metal to a cylinder wall and to the face of the ring or ring assembly, as well as to other rings mounted on a piston, during the early period of operation thereof.

Second, to provide an assembly of the type described including a thin split element of relatively soft metal such as brass, Babbitt metal, or one of the so-called lubricating or bearing metals, the said element being mounted on a piston ring in a groove in the latter and serving to quickly coat the cylinder wall and wall engaging surface of said ring so as to prevent scuffing during the initial wear-in period of operation of the assembly, or later in the event of failure of the lubricating system or insufficient lubrication.

Third, to provide an assembly of the type described wherein the lubricating metal element has a dished outline serving to frictionally maintain the same from substantial peripheral movement with reference to the main piston ring while enabling the groove formed in the ring to receive the soft metal member to be made of sufficient size to accumulate a quantity of lubricating oil therein and more effectively lubricate the cylinder wall.

Fourth, to provide an assembly of the type described having a dished insert of relatively soft lubricating metal and a relatively hard main ring on which the insert is mounted to afford adequate durability and maintain suitable cylinder wall pressure during both the initial and subsequent periods of operation of the assembly.

Fifth, to provide an assembly of the type described including a dished or concaved insert effective to engage the cylinder wall and quickly deposit a film of scuff preventing lubricating metal as described, the outline of the ring serving to prevent objectionable noise during this initial wearing-in-period.

Objects relating to details and economies of the invention will appear from the description to follow. The invention is defined in the claims.

The present invention relates to a piston ring or piston ring assembly including as an element thereof a thin split insert of a suitable relatively soft wearable metal such as brass, Babbitt metal, or one of the so-called lubricating metals, adapted when utilized in accordance with my invention in conjunction with a main piston ring, to deposit a thin film or coating of metal on the cylinder wall and also on the wall engaging surface of the piston rings associated with the piston.

In my copending applications, Serial No. 302,858, filed November 4, 1939, and Serial No. 327,162, filed April 1, 1940, I illustrate and describe rings or ring assemblies of this general type and the present invention in particular includes improvements and refinements on the structure of those applications whereby not only is the quick and effective deposition of such a lubricating film accomplished during the early stages of operation of the assembly without noise or vibration but in addition the proper placement or installation of the lubricating metal elements is greatly facilitated, the operation thereof during said initial period improved, and the operating characteristics with respect to blow-by and cylinder wall lubrication is much enhanced. The factor of improved lubrication is an important one in the present structure, by reason of the fact that it provides an oil reservoir serving to maintain a quantity of oil at all times within the piston ring receiving groove, notwithstanding the fact that the assembly is primarily designed for installation in a compression or sealing ring groove as distinguished from an oil ring groove.

Preferred embodiments of the invention are illustrated in the accompanying drawing, in which:

Fig. 1 is an enlarged fragmentary view in vertical section illustrating an assembly in accordance with the preferred embodiment of my invention, the relation of the parts being indicated at the time of installation at the assembly.

Fig. 2 is a view similar to Fig. 1, illustrating the parts following predetermined initial wearing-in of the assembly, particularly the lubricating metal element or insert thereof.

Fig. 3 is an enlarged fragmentary view in vertical section illustrating the dished or concaved coating or film producing element or insert of soft lubricating metal incorporated in the assembly of my invention.

Fig. 4 is a plan view further illustrating the said element.

Fig. 5 is an enlarged fragmentary view in vertical section illustrating the manner in which the coating element is readily assembled with a main piston ring member, thus facilitating the procedure of properly locating the element relative to the member while at the same time assuring that the two will be frictionally maintained from displacement following assembly.

Fig. 6 is an enlarged view in vertical section illustrating a piston ring assembly in accordance with a modified embodiment of the invention.

In my copending applications Serial Nos. 302,858 and 327,162 identified above, I illustrate and describe improved piston ring assemblies each characterized by a thin split metal element or insert of a relatively soft so-called lubricating metal associated with a main split member of relatively hard material for the purpose of providing a composite ring adapted to wear-in quickly during the initial stage of operation thereof, while applying a coating of lubricating metal to the cylinder wall and to the wall engaging surfaces of the main ring and other rings associated with the piston. These previously proposed elements of lubricating metal may be associated in fixed or loose relation with the main ring, but I have found that usually when the coating element is loose and capable of turning movement relative to the main ring, and also where a flat insert is employed, whether loose or anchored, there is a tendency for the assembly to squeak during the period immediately following its installation, due no doubt to a tendency to vibrate freely characterizing a flat, very flexible element and to the failure to damp vibrations set up therein by gripping the element in any way. Moreover, in loose installations there is a possibility of the thin split soft metal element catching on the cylinder as the piston and rings are tapped into the cylinder bore thereby making the task of installation more difficult.

However, an assembly in which the soft metal element is loose in and occupies less than the axial dimension of a groove in the main ring member receiving the same has a decided advantage in that a pocket or reservoir is provided in the groove for the accumulation of a certain quantity of oil which is maintained in contact with the cylinder wall and this accumulated quantity serves to continually lubricate the cylinder wall in a very desirable manner.

It is therefore the general purpose of the present assembly to incorporate the advantages of the loose and tight mountings of the film applying element in its carrier in a single structure. For this purpose I employ a thin split element of lubricating metal, which is dished in outline and which eliminates all of the defects referred to above while securing all of the advantages.

Referring to the drawing, the reference numeral 1 indicates the piston of an internal combustion engine which is reciprocable in a cylinder 2. The piston is provided with a plurality of annular grooves 3, the one illustrated being an intermediate or scraper ring groove and receiving a piston ring assembly generally indicated by the reference numeral 4.

This assembly consists of an annular split main piston ring 5 preferably of cast iron and generally rectangular in cross section, though cut away or peripherally grooved slightly at 6 to provide a scraping edge accommodating oil scraped from the cylinder wall. Immediately adjacent this cut back edge 6 but spaced from the bottom of the ring, the member 5 is provided with a relatively deep annular groove 7 which extends radially inwardly of the member for a substantial distance. The radial depth of the groove is approximately .040 to .060 inch in a typical installation which is much deeper than the grooving in any other piston rings of which I am aware.

The reference numeral 8 indicates a thin annular split element of brass, bronze, Babbitt metal or any so-called lubricating metal, which element is disposed in and guided by the groove 7 in the reciprocation of the piston. As clearly indicated in Fig. 3, element 8 is dished or concaved substantially so that in the installed piston illustrated in Fig. 1 the top and bottom surfaces thereof lie at an angle to the radial walls of the groove. The groove is of an axial width slightly less than the over-all axial dimension of the element 8, with the result that when installed the latter frictionally engages or wedges in the groove so as to normally resist relative angular movement therein, but not so strongly as to prevent the element from being manually shifted upon installation. This enables the element to be positioned so as to break the joint of the main ring 5 if such is desired.

With regard to the axial thickness of the material of the element 8, it is maintained as small as practical. Thus, not more than 30% of the total face width of the ring 5 is adapted to engage the cylinder wall should be constituted by the soft metal element 8 and I consider it desirable to reduce this figure to 10% or even less. It should be made just as narrow in proportion to the main cast iron ring as is practically possible and still maintain the desired strength and durability during the initial wear-in period.

It has been pointed out above that the main ring is cut back or annularly grooved at 6 to provide a scraper edge. In conjunction with this cut-back portion, the element 8 operates very effectively in controlling the thickness of the oil film on the cylinder wall. Moreover, the space provided interiorly of the groove 7 by the dished element or insert 8 and not occupied by the material thereof accumulates oil scraped from the wall and maintains the same in position to effectively lubricate the wall adjacent element 8.

The manner in which my assembly operates to prevent scuffing during the early wear-in period thereof is clearly indicated in Fig. 2, wherein the reference numeral 9 designates a thin film or coating of the lubricating metal deposited on the cylinder wall by element 8. It will be appreciated that when the main ring 5 and other piston rings on the piston engage this film, a portion thereof is retransferred to them so that all parts are effectively covered with a protective coating which prevents scuffing, as aforesaid, and which in conjunction with the oil maintained against the cylinder wall by the dished element insures that the cylinder wall will be properly lubricated and proof against scuffing in the event of the failure of the lubricant circulation system or a deficiency in lubrication for any other reason.

I have found that the dished and frictionally restrained insert completely eliminates a squeaking noise which has been found to be present in the case of a flat insert, particularly when such flat insert was loosely mounted on the carrier element. Another feature of striking importance is in the remarkable blow-by control exerted by a dished element assembly such as I here propose. The blow-by control of the present assembly is so unusually pronounced and effective as seemingly to defy technical explanation and I do not attempt to advance any theoretical reason therefor. Nevertheless it is far more effective than that possible with other inserts, flat or otherwise and with other ring installations with which I am familiar.

The present coating or film forming elements are easy to install on the piston ring and moreover the assembly of the piston with the ring thereon in a cylinder is likewise facilitated because of the frictional grip of the element on the ring, which enables the same to be accurately positioned in the groove in the ring and maintained in that position. The manner in which the element is initially mounted on the ring 5 is indicated in Fig. 5.

By preference I dispose the dished element 8 in such manner that it is concave toward the top of the assembly, in other words, so that the concave and upper portion thereof engages the upper and longer of the radial groove walls in the ring. However, it will be appreciated that this relation may be reversed and in large measure the resultant combination possesses the advantageous features to which I have referred.

In Fig. 6 I illustrate a somewhat modified embodiment of the invention, wherein the groove 10 receiving the coating element 9 is spaced above the recessed annular scraper edge 11 of the main ring 12. The radial walls of the groove 10 in this case are of equal length. In other respects, the two installations are similar.

I have illustrated and described my improvements in embodiments which are very practical. I have not attempted to illustrates or describe other embodiments or adaptations since it is believed that this disclosure will enable those skilled in the art to embody or adapt my improvements as may be desired.

Having thus described my invention, what I claim as new and desire to secure by Letters Patent, is:

1. A piston ring assembly comprising an annular split main cast iron member of approximately rectangular section having a circumferential groove formed on the outer periphery thereof and extending substantially into the member, and a thin split element of lubricating metal disposed in said groove, said element being uniformly dished in outline throughout and the inner and outer sides thereof initially engaging the cylinder wall and bottom of the groove in installed position, the axial dimension of said groove being somewhat less than the over-all axial dimension of the element whereby a frictional gripping action is exerted on the groove walls to maintain the element in place, the space in the groove not occupied by the element constituting an oil reservoir for the accumulation and maintenance of a continuous annular supply of oil adjacent the cylinder wall, said main member being further annularly recessed adjacent and communicating with said groove.

2. A piston ring assembly comprising an annular split main member having a circumferential groove formed on the outer periphery thereof and extending approximately .040–.060 inch into the member, and a thin split element of lubricating metal disposed in said groove, said element being uniformly dished in outline throughout and the inner and outer sides thereof initially engaging the cylinder wall and bottom of the groove in installed position, the axial dimension of said groove being somewhat less than the over-all axial dimension of the element whereby a frictional gripping action is exerted on the groove walls to maintain the element in place, the space in the groove not occupied by the element constituting an oil reservoir for the accumulation and maintenance of a continuous annular supply of oil adjacent the cylinder wall, said main member being further annularly recessed adjacent and communicating with said groove.

3. A piston ring assembly comprising an annular split main member having a circumferential groove formed on the outer periphery thereof and extending substantially into the member, the walls of said groove being of unequal radial width and a thin split element disposed in said groove, said element being uniformly dished in outline throughout and the axial dimension of said groove being somewhat less than the over-all axial dimension of the element whereby a frictional gripping action is exerted on the groove walls to maintain the element in place.

4. A piston ring assembly comprising an annular split relatively hard main ring member of approximately rectangular section having a circumferential grove formed on the outer periphery thereof and extending substantially into the member, and a thin split scraper element of relatively soft lubricating metal disposed in said groove, said element being uniformly dished in outline throughout and frictionally engaging the walls of the groove and the outer edge thereof engaging the cylinder wall in installed position, said main ring member being recessed at its lower outer edge in communication with said groove whereby to provide an enlarged oil collecting space adjacent the groove.

5. A piston ring assembly comprising an annular split main ring member of approximately rectangular section having a circumferential groove formed on the outer periphery thereof and extending substantially into the member, the top and bottom walls of said groove being of unequal radial width, and a thin split scraper element disposed in said groove, said element being uniformly dished in outline throughout and frictionally engaging the top and bottom walls of the groove, with the concave side thereof engaging the wider groove wall and the outer edge thereof engaging the cylinder wall in installed position.

HAROLD P. PHILLIPS.